May 16, 1950     S. SCHNELL     2,508,194
TWO-FORWARD SHOE SELF-CENTERING BRAKE
Filed June 22, 1945     2 Sheets-Sheet 1
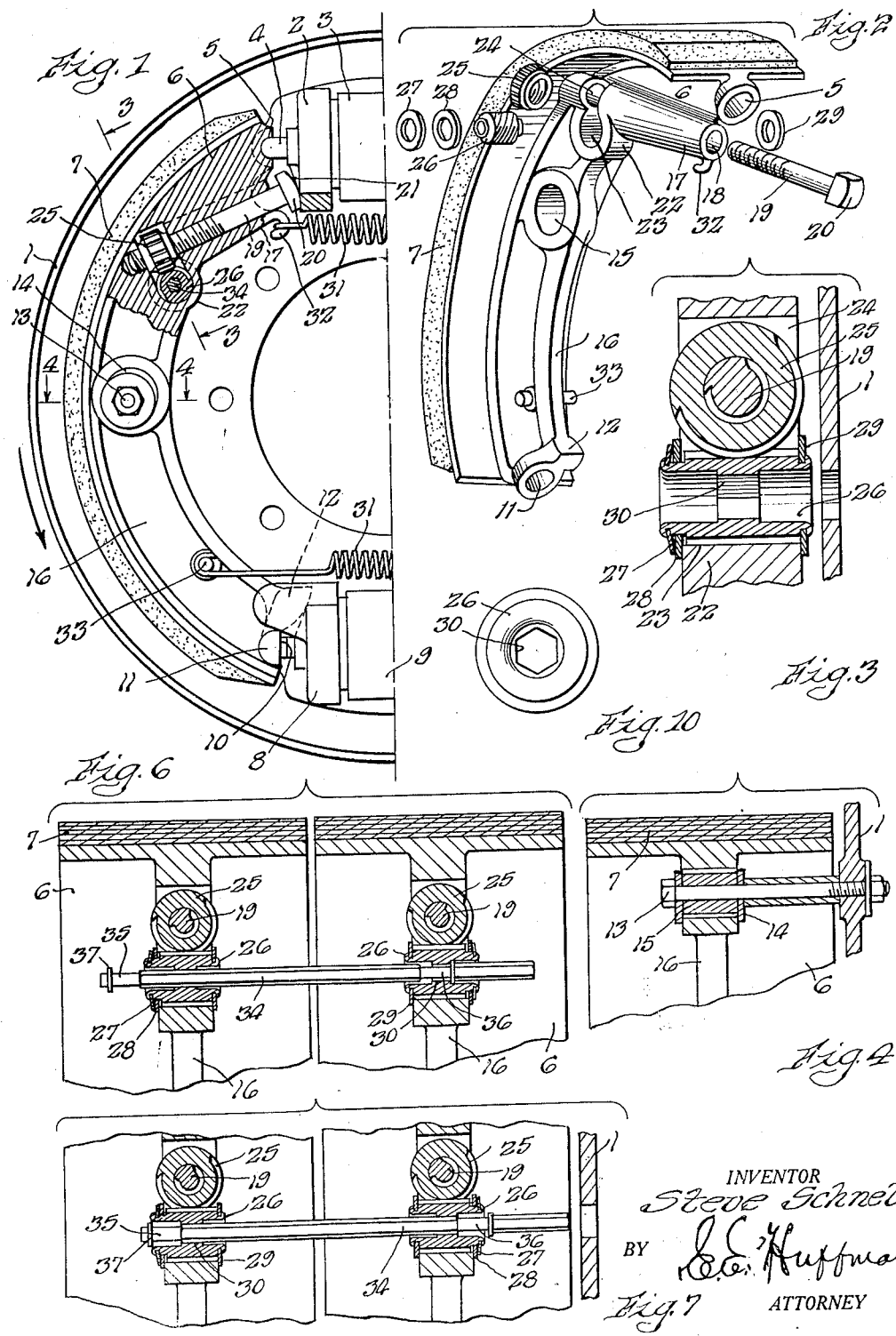
INVENTOR
Steve Schnell
BY
ATTORNEY

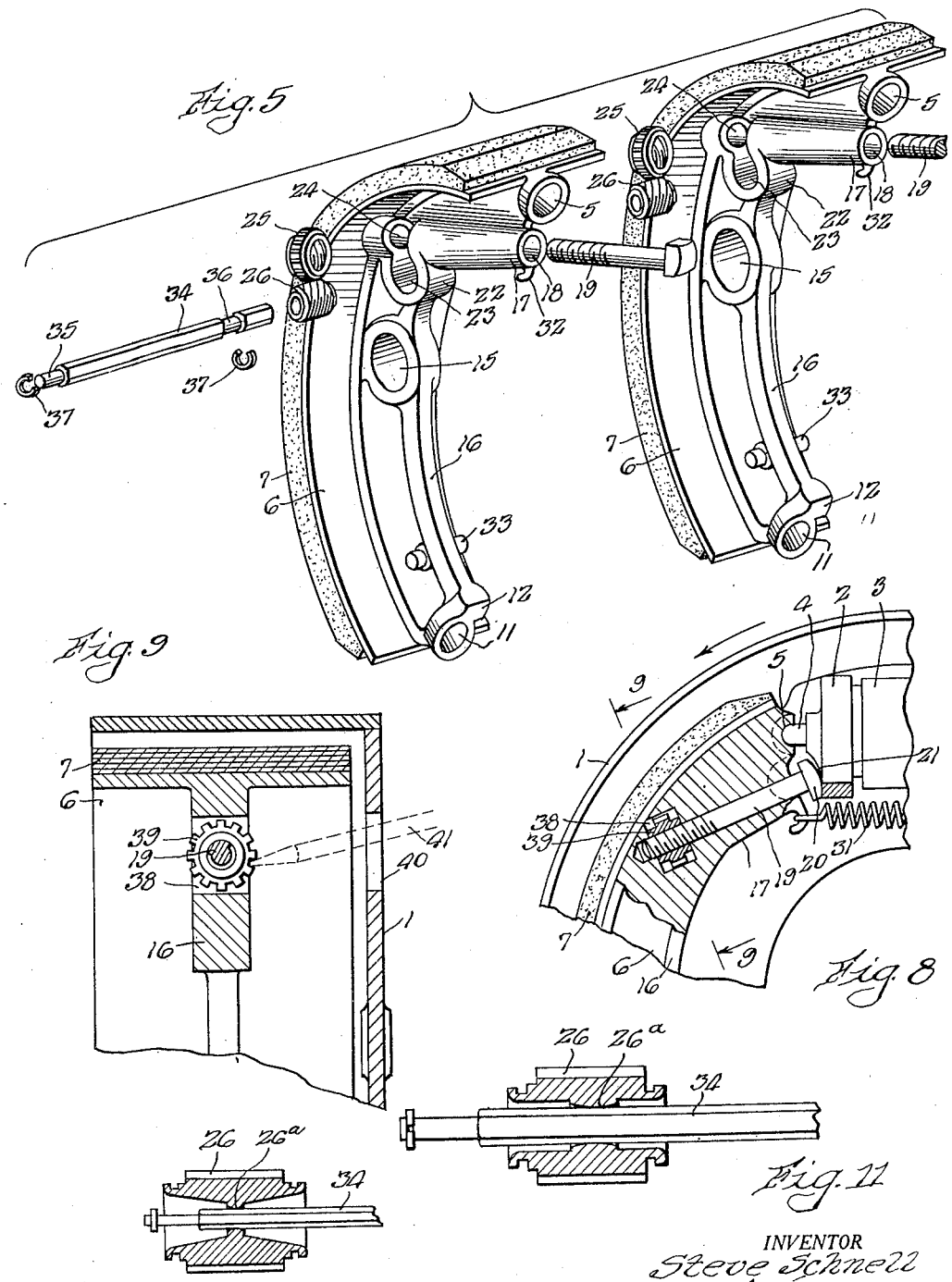

Patented May 16, 1950

2,508,194

UNITED STATES PATENT OFFICE 2,508,194

TWO-FORWARD SHOE SELF-CENTERING BRAKE

Steve Schnell, Kirkwood, Mo., assignor to Wagner Electric Corporation, St. Louis, Mo., a corporation of Delaware Application June 22, 1945, Serial No. 600,920

7 Claims. (Cl. 188—79.5)

This invention relates to brake adjustment means and in its more specific aspects is directed to a device for altering the position of a thrust conducting member in a brake shoe.

One of the objects of the invention is to provide a brake shoe having an adjustable abutting element engageable with a rigid abutment member secured to the backing plate.

Another object of the invention is to provide a variably positioned abutting member engageable with a rigid abutment member secured to a backing plate and in which the abutting member is controllable from a position exterior of the backing plate.

Still another object of the invention is to provide an adjustable abutment member associated with a brake shoe whose axial position is controllable from a position exterior of the backing plate of the brake assembly and which is engageable with a rigid abutment member on the backing plate.

A further object of the invention is to provide a dual brake each of whose members is equipped with a variable abutment member engageable with a fixed abutment member secured to a backing plate or brake spider and in which the variable abutment members may be jointly or severally adjustable.

A still further object of the invention is to provide in a dual brake assembly a variable abutment member on each of the brake shoes engageable with a fixed abutment member in which the adjusting means on each adjacent shoe are so related that they may be jointly or severally adjusted by a single member operable from a position exterior of the backing plate.

Other and further objects of the invention will occur to those skilled in the art to which this invention pertains as the description proceeds, which, taken in connection with the accompanying drawings, sets forth a preferred embodiment of the invention and selected modifications thereof but such disclosures are not to be construed as a limitation of the invention which is limited only by the appended claims and any and all modifications, alterations and variations of structure coming within the spirit and scope thereof are deemed to be included herein.

In the drawings:

Figure 1 shows an elevational view of a portion of a brake assembly;

Figure 2 shows an exploded view of the brake shoe adjusting means of Figure 1;

Figure 3 is a sectional view taken substantially along the line 3—3 of Figure 1;

Figure 4 is a sectional view taken substantially along the line 4—4 of Figure 1;

Figure 5 shows an exploded view of a dual brake assembly incorporating the adjusting means of Figure 1;

Figure 6 shows a sectional view of a dual brake assembly through the same relative position as the line 3—3 of Figure 1 in which the left-hand shoe is adjusted;

Figure 7 is a view similar to Figure 6 in which the right-hand shoe is adjusted;

Figure 8 shows a modification of the adjusting means of Figure 1;

Figure 9 is a sectional vew taken substantially along line 9—9 of Figure 8;

Figure 10 is an enlarged end view of the adjusting nut;

Figure 11 is an enlarged sectional view of the adjusting nut; and

Figure 12 is a sectional view of a modified adjusting nut.

This invention constitutes an improvement over the disclosure of applicant's copending application Serial No. 590,579 filed April 27, 1945, issued as U. S. Patent No. 2,453,866. The copending application shows a structure which is intended to take up the brake thrust in a reverse braking operation so that the operating mechanism for actuating the brakes will not receive the brake thrust but will be taken up by a fixed abutment secured to the backing plate. The instant disclosure seeks to improve and simplify the operation of the aforementioned device and to render its operation more positive and to prevent distortion of the parts so that there will be no possibility of brake thrust being taken up by the brake cylinder when a reverse braking operation is performed. The thrust absorbing member is a part of the brake shoe and provides means for varying the relative position of the thrust absorbing member and the shoe. This member makes possible the adjustment of the brake shoe for lining wear as well as any other distortions that may take place in the brake assembly.

The above objects and advantages are set forth in the structure disclosed in the accompanying drawings in which the numeral 1 is a conventional backing plate to which is secured a fixed abutment element 2. This abutment element is constructed in the same manner as the corresponding abutment element in the above identified application. A brake cylinder or motor 3 is slidably associated with the abutment element and has a piston rod 4 extending through an appropriate aperture in the abutment 2 seated in a socket 5 formed in the toe end of brake shoe 6. The shoe 6 has a suitable friction element 7 secured thereto which is engageable with the friction surface of the drum cooperating therewith.

Another abutment 8 is rigidly secured to the backing plate 1 substantially opposite abutment 2 in which a brake cylinder or motor 9 is slidably received and has a piston rod 10 extending through an appropriate aperture in abutment 8. The end of the piston rod seats in a socket 11 formed in the heel end of brake shoe 6, said brake shoe having a portion 12 fitting within the slot formed in abutment 8. The construction of abutment 8 is identical with the corresponding abutment in the above identified application. The slotted construction holds the shoe in position with respect to abutment 8. Guiding the shoe substantially midway thereof is a suitable member comprising a bolt 13 which is threaded into the backing plate and may be locked thereto. A sleeve and collar construction 14 is received in aperture 15 formed in web 16 of the shoe. This latter construction is conventional in the art and may assume any one of a desired number of forms, the foregoing being suggestive only.

The web 16 (Figure 2) near the toe end of the shoe has an enlargement 17 formed thereon which is bored at 18 to receive a bolt 19 whose head 20 is engageable by radial thrust receiving surface 21 on abutment 2. The web 16 is bossed as at 22 so that an aperture 23 may be formed therein, and the enlargement 17 is integrated with the boss portion 22. A slot 24 is formed in enlargement 17 and boss 22, a construction which is intended to receive gear 25 threaded to bolt 19. A second gear 26 is arranged in aperture 23 and is held therein by suitable retaining elements 27, 28 and 29 in which 27 is a spring retainer engageable with washer 28. The washer 29 is received in an appropriate groove formed in gear 26 in which washer 29 is retained. Gear 26 meshes with gear 25 and is rotatable in aperture 23.

Gear 26 (Figures 3 and 10) is bored and at its center has a hexagonal opening 30 formed therein which is intended to receive a hexagonal rod whereby gear 26 may be rotated to thereby ultimately rotate gear 25 and axially move bolt 19. The hexagonal rod insertable in the correspondingly shaped aperture 30 may be so arranged that it is permanently installed or may be removable. The rod is further known in the art as an "Allen" wrench. The hexagonal rod extends through the backing plate where it can be reached so that the abutment element or head 20 and bolt 19 may be adjusted with respect to the radial surface 21 on abutment 2. Bolt head 20 (Figure 2) is formed and shaped, preferably circular in contour, so that it will properly engage with abutment surface 21.

Retracting spring 31 (Figure 1) is engageable with a hook 32 forming a brake shoe and the opposite end of spring 31 is engageable with a pin 33 secured in the web portion 16 of the shoe. The retracting spring and mode of assembly is likewise conventional in the art.

It is evident from the foregoing that the abutment element formed by head 20 on bolt 19 can be axially moved with respect to the fixed abutment 2 to compensate for lining wear and any distortion which may be present in the brake drum.

Figures 5, 6, and 7 show the construction of Figures 1 through 4 as applied to a dual brake assembly. The appropriate backing plate and spider assembly on which the abutment elements and brake cylinders or motors are supported is conventional in the art and is not disclosed in the interest of clarity. The same numerals are applied to the respective gear elements as occur in Figures 1 and 2 as well as the mode of operation and means for retaining gears 26 and 27 in position in webs 16 of the shoe elements. Each of gears 26 in Figures 6 and 7 is provided with a hexagonal aperture through the centers thereof. Each of said gears 26 in the respective shoe elements is disposed coaxially and has a hexagonal rod 34 axially movable therein which is preferably permanently installed in the coaxially disposed gears. The hexagonal rod 34 is so disposed with respect to the backing plate that it may be rotated at will from a position exterior of the brake assembly. Rod 34 is loosely received in gears 26 to enable the shoes to move relatively to each other and thereby prevent binding of rod 34 in the gears 26. The loose fit constitutes a universal coupling action between gears 26, the apertures 30 therein being so shaped and proportioned to enable the shoes 6 to have relative motion. The hexagonal faces in the aperture 30 are shown in enlarged view of Figure 11 as having a slight curvature 26a to permit the coupling action.

The hexagonal rod 34 previously discussed has undercut portions 35 and 36 formed thereon which are of lesser diameter than the hexagonal portions within gears 26. Retaining means 37 are shown on rod 34 to hold the rods in place in order to prevent them becoming disengaged from the gear elements. The rod 34 may be axially moved so that the undercut portions 35 and 36 will be opposite the hexagonal opening within gear 26 to thereby enable gears 25 to be rotated severally or jointly so that both shoes 6 may be radially adjusted and have their abutments adjusted separately or together, depending upon the position the hexagonal rod 34 assumes with respect to each of gears 26. Figure 6 shows rod 34 positioned so that gear 26 is rotated in the left-hand shoe with gear 26 in the right-hand shoe remaining at rest, while in Figure 7 the rod is so set that both of gears 26 may be rotated. Obviously rod 34 could be moved to the extreme right-hand position from that disclosed in Figure 6 whereupon gear 26 in the left-hand shoe would be at rest and gear 26 on the right-hand shoe rotated. It should be apparent from the foregoing that each of the shoes may be jointly or severally adjusted, depending upon the axial position of rod 34 in the several gear elements 26.

A modification of the foregoing is set forth in Figures 8 and 9 in which the same backing plate elements are provided, fixed abutment 2 being arranged thereon with brake cylinder or motor 3 freely slideably associated therewith. The shoe structure and its relationship to the abutment is identical with that set forth in Figure 1 above. Bolt 19 is inserted in an aperture formed in enlargement 17 on the web of the shoe having an aperture 38 formed therein in which an element 39 similar to a star wheel is inserted but is threaded to bolt 19. The head 20 of bolt 19 engages the radial surface on abutment 2. Opposite aperture 38 is an aperture 40 in the backing plate 1 through which a screwdriver or other suitable tool 41 may be inserted to engage the tooth elements on star wheel 39 so that it may be rotated to thereby axially move bolt 19 in the bore formed in enlargement 17.

When the brake drum associated with the assembly is rotating in the direction of the arrow (Figure 1) the brake thrust is transmitted by the member or enlargement 12 to abutment 8. During reverse rotation the brake thrust is transmitted by bolt 19 and its head 20 to abutment 2. The brake cylinder in each instance does not have any brake thrust applied to it, thereby enabling it to float in the abutment element.

Figure 10 shows a modified gear construction in which gear 26 has the usual hexagonal opening 30 for receiving the hexagonal rod 34. Instead of having a straight bore as shown, for example, in Figure 3, the gear has a bore tapered from the hexagonal center to the ends thereof. Rod 34 is thus enabled to move and pivot more freely therein to produce the universal coupling action described above.

Having fully described my invention, that which I claim as novel and desire to protect by Letters Patent of the United States is:

1. In a dual brake assembly, a pair of brake shoes arranged adjacent each other; an element on each of said shoes movable relatively to each of said shoes and engageable with fixed abutments; a gear set operatively associated with each of said shoes to actuate said elements; and means connecting each of said gear sets, said means axially adjustable with respect to each of said gear sets constructed and arranged to selectively severally or jointly operate each of said gear sets.

2. A brake assembly comprising a plurality of brake shoes disposed adjacent each other; a movable abutment element in each of said shoes; a gear on each of said shoes to move said abutment element; a rod connecting each of said gears constructed and arranged so that upon a selected axial movement either or all of said gears may be rotated; and said gears on the interior thereof constructed to enable said rod to have a universal coupling action thereon.

3. A brake assembly comprising a plurality of brake shoes disposed adjacent each other; an abutment element in each of said shoes; a gear on each of said abutment elements to axially move same; a second gear in each of said shoes to rotate said gear on said abutment element; and a hexagonal-shaped rod connected between said gears whose interior is shaped complementary to said rod to enable said rod to have a universal coupling action with respect to said gears.

4. A dual brake assembly comprising a pair of brake shoes, each shoe having means on each end to receive a brake applying force; an element in each of said shoes engageable with a brake thrust receiving member; means to adjust each of said elements relative to the shoe in which it is mounted; and a rod connecting each of said means, said rod constructed and arranged so that by axially moving it relatively to said means said elements may be selectively severally or jointly actuated to severally or jointly adjust said elements.

5. A dual brake assembly comprising a pair of brake shoes, each shoe having means on each end to receive a brake applying force; an adjustable element on each of said shoes engageable with a brake thrust receiving abutment; means engaging said element on each shoe to move same relatively to said shoe; and means connecting each of said means to actuate same, said connecting means having formations thereon arranged so that upon axial movement of said connecting means said engaging means may be selectively individually or jointly operable to severally or jointly adjust said elements.

6. A brake assembly comprising a plurality of brake shoes arranged adjacent each other, each of said shoes having means on each end to receive a brake applying force; means in each of said shoes having a member thereon engageable with brake thrust receiving members; means to adjust the position of said means in each of said shoes; and means connected between each of said adjusting means to selectively jointly or severally actuate said adjusting means.

7. A brake assembly comprising a plurality of juxtapositioned brake shoes having means on each end to receive a brake applying force and arranged adjacent each other; a rod in each of said shoes having a member thereon engageable with a brake thrust receiving member; a member threaded to said rod to axially adjust said rod in each of said shoes; and means connected between each member to selectively jointly or severally actuate each of said members.

STEVE SCHNELL.

REFERENCES CITED

The following references are of record in the file of this patent:

UNITED STATES PATENTS

| Number | Name | Date |
| --- | --- | --- |
| 2,049,628 | Rowland et al. | Aug. 4, 1936 |
| 2,294,293 | Goepfrich | Aug. 25, 1942 |
| 2,384,614 | Forbes | Sept. 11, 1945 |